United States Patent [19]

Sutter

[11] 4,039,874

[45] Aug. 2, 1977

[54] MOTOR-DRIVEN CONTROL DEVICE WITH AUTOMATIC BRAKE

[75] Inventor: Jean Georges Sutter, Villers-les-Nancy, France

[73] Assignee: Pont-A-Mousson S.A., Pont-a-Mousson, France

[21] Appl. No.: 643,654

[22] Filed: Dec. 23, 1975

Related U.S. Application Data

[62] Division of Ser. No. 370,261, June 15, 1973, Pat. No. 3,946,984.

[30] Foreign Application Priority Data

| June 19, 1972 | France | 72.22078 |
| Nov. 8, 1972 | France | 72.39455 |
| Apr. 25, 1973 | France | 73.14916 |

[51] Int. Cl.$^2$ .............................................. H02K 7/10
[52] U.S. Cl. ................................................... 310/77
[58] Field of Search .................. 310/76, 77, 92, 93, 310/162, 163; 251/130, 133, 134, 135, 136

[56] References Cited

U.S. PATENT DOCUMENTS

| 2,543,830 | 3/1951 | Burrus et al. ....................... 310/77 X |
| 2,544,448 | 3/1951 | Downey .......................... 310/77 UX |
| 2,823,325 | 2/1958 | Stephan ................................. 310/77 |
| 2,956,188 | 10/1960 | White ............................... 251/133 X |
| 2,992,807 | 7/1961 | Karlby et al. ..................... 251/134 X |
| 3,038,109 | 6/1962 | Mowery, Jr. et al. ............. 310/77 X |
| 3,562,565 | 2/1971 | Higashino et al. ...................... 310/77 |

*Primary Examiner*—Mark O. Budd
*Attorney, Agent, or Firm*—Sughrue, Rothwell, Mion, Zinn and Macpeak

[57] ABSTRACT

A device is disclosed for braking the rod of an electric motor driven valve when the electric motor is put out of action and releasing the rod when the motor is brought into action. It includes a magnetic core integral with the stator of the motor and a magnetic armature capable of being attracted by the core to release the rod when the motor is supplied with current. Spring means automatically returns the device to its rod braking position when the supply of current to the motor is cut off.

8 Claims, 4 Drawing Figures

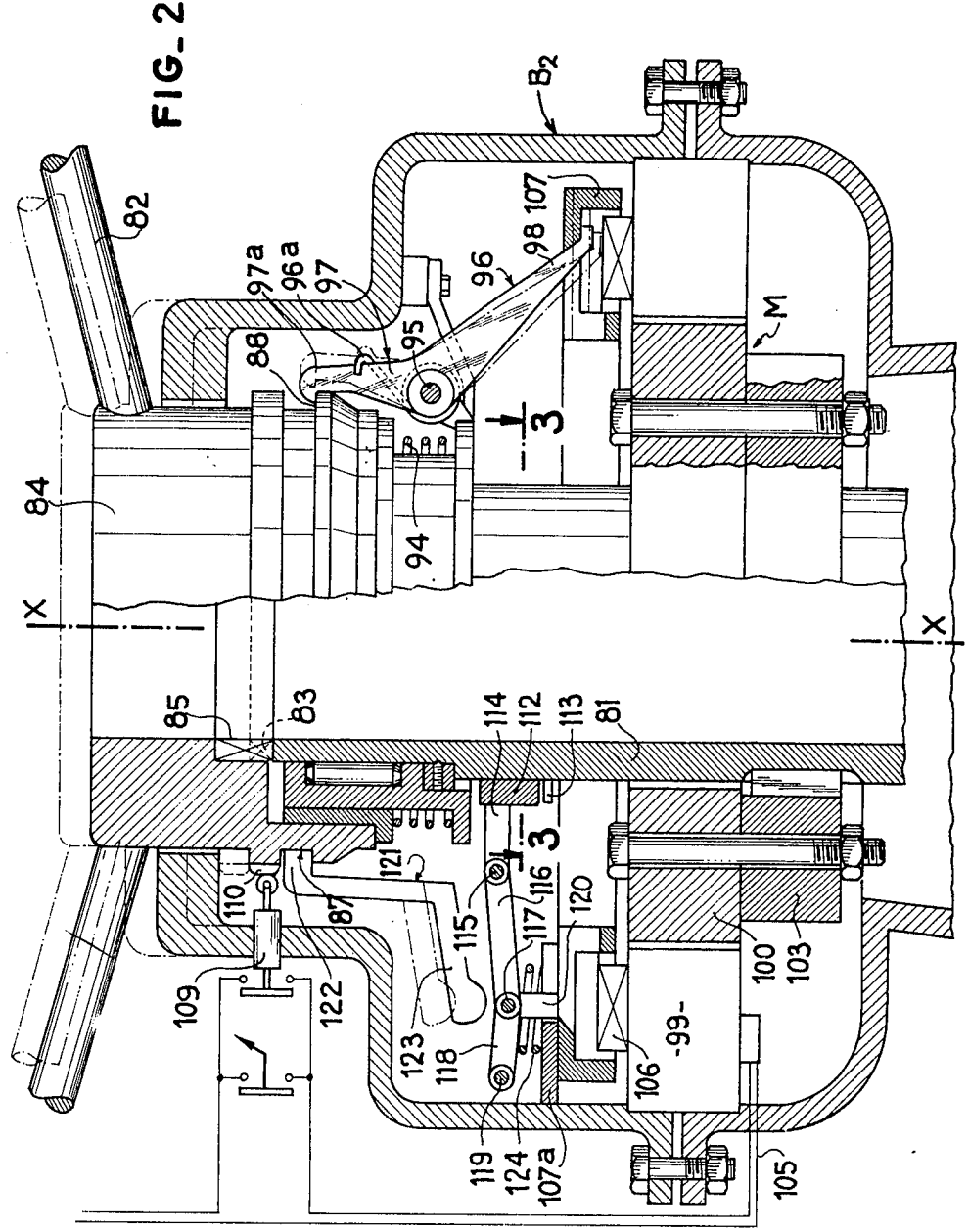
FIG_2

MOTOR-DRIVEN CONTROL DEVICE WITH AUTOMATIC BRAKE

RELATED APPLICATIONS

This application is a division of my application Ser. No. 370,261, filed June 15, 1973, now U.S. Pat. No. 3,946,984, issued May 30, 1976.

FIELD OF INVENTION

The present invention relates to a device for controlling a rod actuating a valve comprising an electric motor whose stator is fixed to the frame of the valve and whose rotor is connected to rotate with the actuating rod coaxially with the latter.

DESCRIPTION OF PRIOR ART

If the closure member of the valve, carried by the actuating rod, is a closure member subjected to a dynamic force on the part of the fluid, for example a butterfly closure member or a valve flap, when the motor is stopped this closure member is not locked in the desired position and moves away from the latter under the action of the torque exerted by the fluid flowing through the valve, for example in rotating freely in the case of a butterfly closure member.

SUMMARY OF THE INVENTION

The present invention has for an object to overcome this drawback and provides a control device of the aforementioned type comprising means for braking the actuating rod and means for automatically applying said braking means when the motor is put out of action and automatically releasing said braking means when the motor is brought into action, said automatic applying means and releasing means for the braking means comprising a magnetic core integral with the stator of the motor and a magnetic armature disposed with respect to said core in such manner as to be attracted by the core and to shift the braking means between their applying and releasing positions when current is supplied to the stator in opposition to elastically yieldable means for returning the braking means to the applying position.

In one particularly advantageous application of the invention the motor is a variable reluctance electric motor.

DESCRIPTION OF THE DRAWINGS

Further features and advantages of the invention will be apparent from the ensuing description given solely by way of example with reference to the accompanying drawings in which:

FIG. 2 is a diametral sectional view, to an enlarged scale, of this control device in the position for manual control;

DETAILED DESCRIPTION OF THE PREFERRED EMBODIMENT

Figure 1:
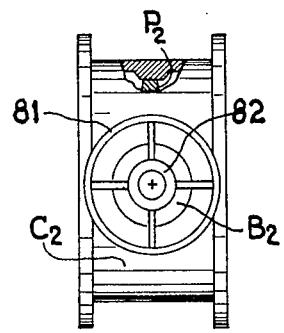
FIG. 1 is a side elevational view of a butterfly valve provided with a control device according to the invention.

The valve shown in FIGS. 1 and 2 comprises a tubular body C, a rotary butterfly valve member P integral with a hollow shaft or actuating rod 91 having an axis X—X. This shaft can be rotated either by a variable reluctance electric motor M, coaxial with said shaft and disposed in a housing B integral with the body C, or by a manual control wheel 92 whose hub 84 is slidably mounted on the end of this shaft and can be connected to rotate therewith by depressing the wheel and engaging clutch dogs 83 and 85 in opposition to the action of a spring 94. The variable reluctance motor M comprises a stator 99 integral with the housing B and a rotor 100 keyed to the shaft 81 by a hub 103 disposed on the opposite side of the rotor to the wheel. An annular magnetic core 106, integral with the side of the stator 99 adjacent the wheel, is capable of attracting an annular U-sectioned magnetic armature 107 which is astride the core. The armature 107 is capable of pivoting toward the stator arms 98 of levers 96 which are disposed in three radial planes R which are spaced 120° apart and contain the axis XX. The levers 96 are pivotably mounted on horizontal pivot pins 95 fixed with respect to the housing B whereas the other arms 97 of these levers have noses 97a which are capable of hooking on a flange 88 difined by a groove 87 in the hub 84 when the latter is axially engaged with the shaft 81. The noses 97a are capable of being released from the flange 88 when the armature 107 pivots the arms 98 in opposition to the action of springs 96a. A circuit 105 supplying current to the stator 99 comprises a switch 109 which opens this circuit under the action thereon of a cam 110 of the wheel 82 when the latter is axially engaged with the shaft 81.

Figure 3:
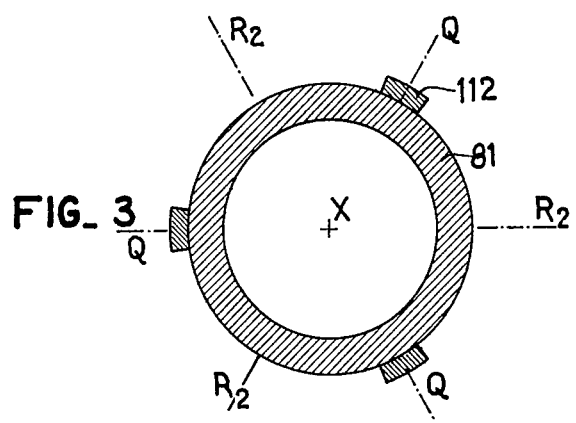
FIG. 3 is a sectional view of the control device taken on line 3—3 of FIG. 2.

The device further comprises three brake shoes 112 disposed at the level of the lever arms 98 and at 120° to each other about the axis X—X in three radial planes Q which alternate with the radial planes R of the levers 96 (FIG. 3) These shoes 112 are guided axially of the shaft 81 by guides 113 integral with this shaft. By way of a modification, they may be guided in an annular groove provided in the shaft 81. They may be provided with friction elements or be ribbed or knurled and co-operate with complementary ribs or knurling provided on the shaft 81. Each shoe 112 is carried by an arm 114 which is oriented in the intended direction of displacement of the shoe, that is to say radial perpendicular with respect to the axis X—X. Pivoted to this support arm 114 by a pin 115 is one end of a link 116. At its other end this link 116 is pivoted by a pin 117 to one end of an arm 118 which is pivotably mounted at its other end on a pin 119 fixed to the housing B. Fixed to the pin 117 is a control rod 120 parallel to the axis X—X and integral with the annular armature 107. The assembly comprising the arm 114, the link 116, the arm 118 and the rod 120 associated with a shoe 112 is located in theradial plane Q corresponding to this shoe and the link 116 and the arm 118 are oriented in a direction substantially radial and perpendicular to the axis X—X when the armature 107 is shifted away from the core 106 into abutment against a ring 107a integral with the housing B. Also provided in each plane Q is a cranked lever 121 having a centre portion which is oriented substantially parallel to the axis X—X and whose end has an inner finger portion 122 which is permanently engaged in the groove 87 in the hub which is capable of turning in this groove about the axis X—X whereas at its other end the lever has an outwardly extending arm 123 whose end is located in front of the corresponding pin 117. A coil spring 124 is compressed between the fixed ring 107a and the pivotal connection between the link 116 and the arm 118. The levers 121 are dimensioned in such manner that when the wheel 82 is depressed and axially engaged with the shaft 81 (FIG. 2), a slight clearance exists between the end of the arms 123 and the pins 117.

Figure 4:
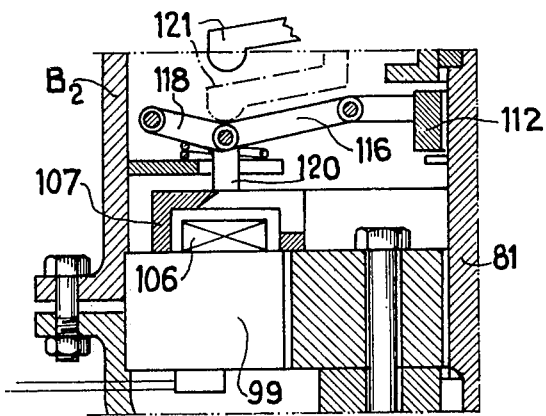
FIG. 4 is a partial view of the device shown in FIG. 2 in the position for electric control.

The device just described operates in the following manner:

For electric control (FIG. 4), the electric motor M is supplied with current so that the magnetic armature 107 is attracted by the core 106 and drives along therewith the rods 120 which consequently shift the pins 117 and pivot the arms 118 and links 116 and compress the springs 124. The brake shoes 112 are thus moved away from the shafts 81 and therefore release the latter. Simultaneously, the noses 96a of the levers 96 are disengaged from the groove 87 (position of these levers 96a shown in dot-dash line in FIG. 2) and the unlocked wheel 82 is urged upwardly by the spring 94 and draws along therewith the levers 121 which thus move away from the pins 117 (position of these levers 121 shown in full line in FIG. 4 and dot-dash line in FIG. 2). The wheel is no longer axially engaged with the shaft 81 and it is the motor M which drives the latter.

Upon stoppage after an electric control of the valve, the motor M has been cut out of circuit and the manual control is not engaged so that the butterfly valve member P could be subjected, in its position for opening the valve, to a rotational torque by the fluid which flows through the valve, this torque varying with the angle of opening of the butterfly valve and being maximum for a certain angle of opening. However, the butterfly valve member is prevented from rotating by the automatic looking of the shaft 81 as soon as the current supplied the stator is cut off, since the armature 110 is moved away from the core 106 under the action of the spring 124 and, as the hub 84 is in the upper position, the levers 121 are moved away from the pivotal connections between the members 16 and 18 so that the latter are subjected solely to the action of the springs 124. The shoes 112 are therefore applied against the shaft 81 with a great force resulting from the multiplication of the force exerted by the springs 124 by the leverage afforded by the links 116.

For manual control (FIG. 2), the electric motor M is cut out of circuit so that the movable armature 110 remains separated from the core 106. The wheel 82 is then depressed axially so as to engage it axially with the shaft 81 through the dogs 83 and 85. In this position it is locked by the levers 96 whose noses 97a hook on the flange 88. In this position (FIG. 2), a slight clearance exists between the levers 121 and the pins 117 so that the shaft remains locked by the shoes 112. In axially depressing the wheel 82 beyond this position the levers 121, which are axially displaced by the groove 87 of the wheel, exert a pressure on the pivotal connections 116, 118 and make them pivot and compress the spring 124. The brake shoes 112 are released from the shaft 81 (position of the levers 121 shown in dotted line in FIG. 4). Simultaneously the armture 107, axially shifted by the rods 120, unlocks the levers 96 from the flange 88. The manual control remains engaged by the dogs 83–85 but the axial thrust on the wheel 82 must be maintained to the full extent to rotate the wheel and the shaft 81 and thereby rotate the butterfly valve member. As soon as the actuation of the valve ceases and the wheel 82 is released axially, the hub 84 and the groove 87 rise and the pivotal connections 116–118 also rise under the effect of the springs 124 and the armature 107 rises and allows the hooking of the groove 87 by the noses 97a of the locking levers 96 (FIG. 2). The manual control is once more locked and the shaft 81 once more braked by the brake shoes 112.

An advantage of this structure, among others, is that both the action of the armature 107 and that of the wheel 82 through the levers 121 are put to use to release the brake shoes 112. This system of braking the shaft 81 is particularly advantageous and effective when rotary closure member assembly has high inertia. It will be understood that this system may be made more progressive by the addition of dashpots to the return springs 124.

Having now described my invention, what I claim as new and desire to secure by Letters Patent is:

1. A control device for actuating a closure member of a valve, comprising an actuating rod having an axis of rotation for connection to the closure member, a frame for association with the valve, an electric motor having a stator secured to said frame, a rotor coaxial with and connected to rotate with the actuating rod, means for braking the actuating rod and means for automatically applying said braking means when the motor is put out of action and automatically releasing said braking means when the motor is brought into action, said automatic applying means and releasing means for the braking means comprising a magnetic core integral with the stator of the motor and a magnetic armature disposed with respect to said core in such a manner as to be attracted by the core and to shift the braking means between their applying and releasing positions when current is supplied to the stator in opposite to elastically yieldable means for returning the braking means to the applying position, and wherein the automatic applying and releasing means for the braking means comprise at least one linkage which comprises a pair of links, a common pivotal connection pivoting ends of said links together, the other end of one link being pivoted to a fixed pin, the other end of the other link being pivoted to the braking means, and said linkage having in a mean position a radial orientation with respect to the rod.

2. A device as claimed in claim 1, wherein the magnetic armature is connected with said common pivotal connection so as to move the links in the direction for folding the pivotal connection when the armature is attracted by the magnetic core.

3. A device as claimed in claim 2, wherein the elastically yieldable means for returning the braking means to the position of brake application comprise in respect of each linkage a spring compressed between the common pivotal connection and a fixed abutment.

4. A control device for actuating a closure member of a valve, comprising an actuating rod having an axis of rotation for connection to the closure member, a frame for association with the valve, an electric motor having a stator secured to said frame, a rotor coaxial with and connected to rotate with the actuating rod, means for braking the actuating rod and means for automatically applying said braking means when the motor is put out of action and automatically releasing said braking means when the motor is brought into action, said automatic applying means and releasing means for the braking means comprising a magnetic core integral with the stator of the motor and a magnetic armature disposed with respect to said core in such a manner as to be attracted by the core and to shift the braking means between their applying and releasing positions when current is supplied to the stator in opposition to elastically yieldable means for returning the braking means to the applying position, and wherein the braking means comprise at least one brake shoe which is radially movable into and out of engagement with the rod, in front of the latter, said rod having a radial guide means for said braking means.

5. A control device for actuating a closure member of a valve, comprising an actuating rod having an axis of rotation for connection to the closure member, a frame for association with the valve, an electric motor having a stator secured to said frame, a rotor coaxial with and connected to rotate with the actuating rod, means for braking the actuating rod and means for automatically applying said braking means when the motor is put out of action and automatically releasing said braking means when the motor is brought into action, said automatic applying means and releasing means for the braking means comprising a magnetic core integral with the stator of the motor and a magnetic armature disposed with respect to said core in such a manner as to be attracted by the core and to shift the braking means between their applying and releasing positions when current is supplied to the stator in opposition to elastically yieldable means for returning the braking means to the applying position, said control device further comprising a manual actuating wheel, means for coupling the wheel to the rod, locking means and unlocking means for said coupling means, and the applying and releasing means for the braking means comprising means for atoumatically applying the braking means upon the simultaneous putting out of action of the manual control and electric motor, and the automatic release of said braking means when at least one of the manual control and electric motor is brought into action.

6. A device as claimed in claim 5, wherein the wheel is coupled to the rod by a depression of the wheel coaxial with the rod in opposition to the action of elastically yieldable means, and the automatic applying and releasing means for the braking means comprise thrust means connected to move with the wheel and capable, when the wheel is rendered integral with the rod, of shifting the braking means from their applied position to their released position in opposition to elastically yieldable means for returning the braking means to their applied position.

7. A device as claimed in claim 6, wherein the automatic applying and releasing means for the braking means comprise at least one linkage which comprises a pair of links, a common pivotal connection pivoting ends of the links together, another end of one link being pivoted to a fixed pin, and another end of the other link pivoted to the braking means, said linkage having in a means position a radial orientation with respect to the rod, and the thrust means comprise a hub of the wheel, a circumferential groove in the hub, at least one lever having one end engaged in the circumferential groove of the hub and an opposite end disposed in facing relation to the common pivotal connection of the linkage so as to fold the linkage when the wheel is depressed into engagement with the rod.

8. A device as claimed in claim 6, wherein the locking means for the coupling means are evenly distributed around the rod and the automatic applying and releasing means for the braking means are also evenly distributed in alternating relation to the braking means.

* * * * *